Patented Jan. 1, 1952

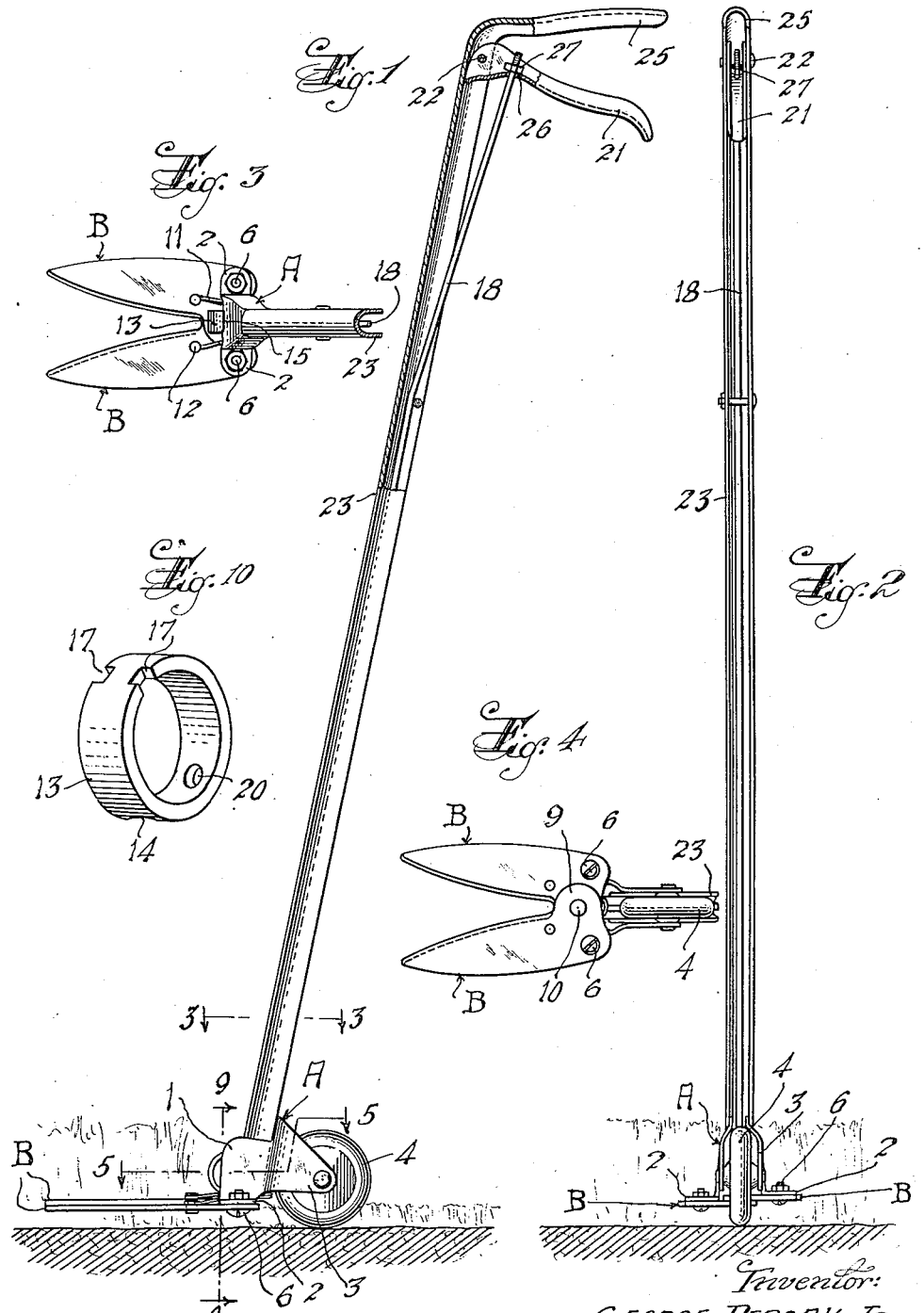

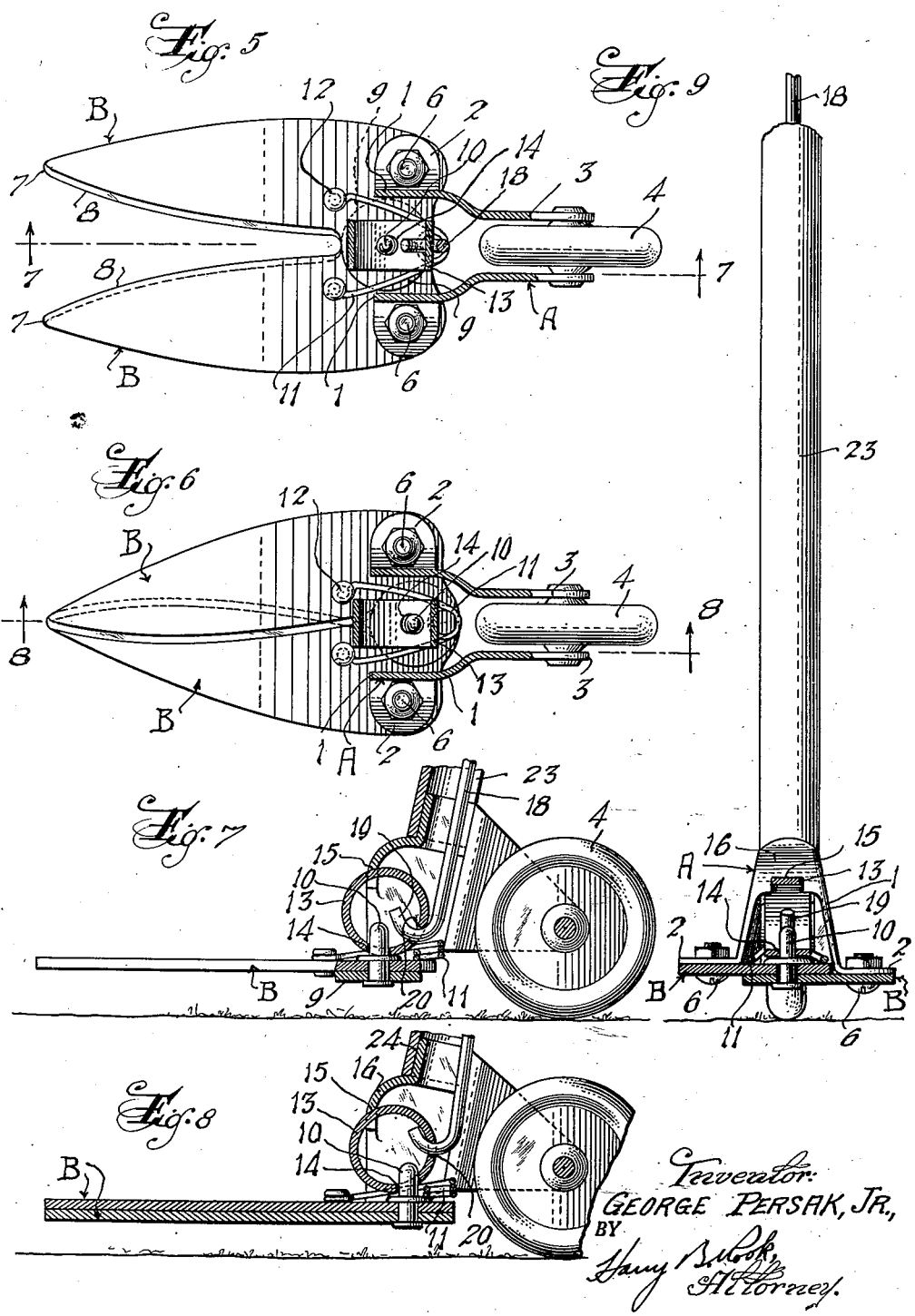

2,580,831

UNITED STATES PATENT OFFICE 2,580,831

LONG-HANDLED GRASS SHEARS

George Persak, Jr., Verona, N. J., assignor to J. Wiss & Sons Co., Newark, N. J., a corporation of New Jersey Application January 14, 1950, Serial No. 138,615

1 Claim. (Cl. 30—251)

This invention relates in general to shears, particularly grass shears, of the type including a pair of cutting blades pivotally mounted on a supporting frame which has a long handle and means operable by the hand at the end of the handle opposite the blades for actuating the blades so that the shears may be easily operated by the operator in standing position.

A prime object of the invention is to provide a long-handled grass shears of this character which shall include an operating hand lever pivotally connected to the handle, a pull rod movable in one direction by said hand lever, and novel and improved, simple, reliable and inexpensive means for transmitting power from said pull rod to the cutting blades.

More especially, the invention contemplates a shears wherein a pivot stud or pin pivotally connects the blades together at a point between the pivotal connections of the blades to the supporting frame; and a further object of the invention is to provide a novel and improved connection between said pull rod and said pivot stud which shall ensure easy and smooth transmission of power from the pull rod to said stud for actuating the blades.

Other objects, advantages and results of the invention will be brought out by the following description in conjunction with the accompanying drawings, in which Figure 1 is a side elevation of a long-handled grass shears constructed in accordance with the invention, portions being broken away and shown in section;

Figure 2 is a rear elevational view of the shears;

Figure 3 is a combined horizontal sectional and top plan view, from approximately the plane of the line 3—3 of Figure 1;

Figure 4 is a bottom plan view of the portions of the shears illustrated in Figure 3;

Figure 5 is an enlarged horizontal sectional view, approximately on the plane of the line 5—5 of Figure 1, showing the cutting blades in their normal positions;

Figure 6 is a similar view, showing the blades swung together during the cutting operation;

Figure 7 is a vertical longitudinal sectional view, approximately on the plane of the line 7—7 of Figure 5;

Figure 8 is a similar view, approximately on the plane of the line 8—8 of Figure 6;

Figure 9 is an enlarged fragmentary front elevational view of the grass shears with portions shown in section, approximately on the plane of the line 9—9 of Figure 1, and Figure 10 is a perspective view of the element for transmitting power from the pull rod to the cutting blades.

For the purpose of illustrating the principles of the invention, it has been shown as embodied in a long-handled grass shears which includes a supporting frame A preferably formed of a single piece of sheet metal which has been shaped to provide spaced and parallel side walls 1 each of which has an arm 2 at its lower end projecting outwardly in the direction opposite to that of the arm of the other side wall. The frame also has rearwardly projecting spaced and parallel legs 3 between which is journaled a supporting wheel 4.

Each of a pair of superposed cutting blades B is pivotally connected at one end on one of the arms 2 by a pivot bolt 6, there being a slight play between each of said bolts 6 and the hole through which it passes in either the arm 2 or the blade. The toe of each blade is pointed, as indicated at 7, and the blade has a curved cutting edge 8 to cooperate with the corresponding edge of the other blade when the blades are swung about their pivots 6 from the position shown in Figure 6 to the position shown in Figure 5. At their heel ends, the blades are provided with lateral pivot ears 9 which are pivotally connected by a stud 10, the upper end of which extends upwardly above the uppermost blade, whereby the blades are pivotally connected together at a point midway between the pivot bolts 6 and the blades may be swung in opposite directions by movement of the pin 10 forwardly and backwardly. A helical spring 11 has each of its ends connected to one of the blades by a stud 12 so that said spring normally actuates the blades to move the cutting edges apart into normal position, as shown in Figure 5.

Mechanism for actuating the blades includes a power transmitting element 13 which has an opening 14 loosely receiving the upper end of the pin 10 and is rockable on the bottom surface of a seat 15 formed by a notch in the front wall 16 of the frame A, said element 13 also having notches 17 in opposite sides thereof to receive the side edges of the seat notch 15. The shape of the power transmitting element may be widely varied, for example cylindrical as shown, or rectangular, or triangular, but it is shown as comprising a section of a hollow cylinder having a portion of its periphery engaging the bottom surface of the seat 15. The opening 14 is radial in this ring-like element and a second radial opening 20 in the element has one end of a pull rod 18 hooked therethrough at 19, the other end of said pull rod being connected to a hand-operating lever 21 one end of which is pivotally connected at 22 to a long handle 23, the lower end of which is rigidly connected at 24 to the top of the frame A while its other end comprises a laterally extending hand-hold 25. As shown, the handle 23 is channel-shaped in cross-section and the major portion of the pull rod 18 lies within said channel, the upper end of the pull rod passing loosely through a hole 26 in the hand lever and having a nut 27 to abut the upper side of the hand lever when the latter is swung upwardly. Also, the pivoted end of the hand lever is disposed within the channel of the handle, and the hand lever is so located with respect to the hand-hold that the fingers of the operator's hand may easily grip the hand lever with the palm of his hand resting on the hand-hold so as to both push the tool over the ground on the supporting wheel and at the same time pull the lever 21 with a squeezing motion of the hand to actuate the cutting blades.

With this construction, it will be observed that when the hand lever 21 is pulled upwardly in Figure 1, the tension thereby exerted on the pull rod 18 will rock the power transmitting element 13 along the base of the seat 15 from the position shown in Figure 7 to the position shown in Figure 8 and thereby pull the pivot pin 10 rearwardly and actuate the blades to move the cutting edges into cooperative cutting relation, as shown in Figures 6 and 8.

It will be observed that the power transmitting element 13 provides a smooth transmission of power from the pull rod to the pivot pin 10, with a minimum of jerking and lost motion. Furthermore, the structure is relatively simple, inexpensive, reliable and durable. The frame A can conveniently be formed of a single piece of metal, is light in weight and yet is capable of withstanding hard usage and rough handling.

While a now preferred embodiment of the invention has been shown for the purpose of illustrating the principles of the invention, it should be understood that the details of construction of the tool may be widely modified and changed and the invention may be embodied in other types of tools having pivotally associated elements of the same general nature of the blades B, all within the spirit and scope of the invention.

Having thus described the invention, what I claim is:

A grass shears comprising a sheet metal frame, a pair of superimposed blades pivotally connected together at their rear ends by a pivot pin whose upper end extends beyond the upper blade, means pivotally connecting said blades to said frame at opposite sides of said pivot pin and means for actuating said blades including a power transmitting element comprising a cylindrical ring, said frame having side walls and a front wall in the lower edge of which is a downwardly facing notch providing a seat, said ring being arranged with its periphery in rocking contact with the bottom edge of said notched seat and having notches at its ends into which project the side walls of said notched seat and said cylindrical ring also having a peripheral opening into which said pivot pin extends, and operating means to cause rocking movement of said power transmitting element.

GEORGE PERSAK, Jr.

REFERENCES CITED

The following references are of record in the file of this patent:

UNITED STATES PATENTS

| Number | Name | Date |
| --- | --- | --- |
| 1,618,817 | Dooley | Feb. 22, 1927 |
| 1,639,677 | Vaughan | Aug. 23, 1927 |
| 1,727,067 | Keefe | Sept. 3, 1929 |
| 1,798,320 | Erickson | Mar. 31, 1931 |
| 2,503,983 | Wright | Apr. 11, 1950 |